US010763751B2

United States Patent
Takada et al.

(10) Patent No.: US 10,763,751 B2
(45) Date of Patent: Sep. 1, 2020

(54) DEVICE AND METHOD FOR CONVERTING INPUT VOLTAGE TO OUTPUT VOLTAGE

(71) Applicant: Sanken Electric Co., Ltd., Saitama (JP)

(72) Inventors: Junichi Takada, Saitama (JP); Mitsutomo Yoshinaga, Saitama (JP); Toshihiro Nakano, Saitama (JP); Koichi Shiotsu, Saitama (JP); Satoshi Funakoshi, Chiba (JP)

(73) Assignee: Sanken Electric Co., Ltd., Saitama (JP)

( * ) Notice: Subject to any disclaimer, the term of this patent is extended or adjusted under 35 U.S.C. 154(b) by 135 days.

(21) Appl. No.: 16/005,741

(22) Filed: Jun. 12, 2018

(65) Prior Publication Data
US 2019/0379290 A1 Dec. 12, 2019

(51) Int. Cl.
*H02M 3/335* (2006.01)
*H02M 1/00* (2006.01)
*G06F 1/3234* (2019.01)

(52) U.S. Cl.
CPC ...... *H02M 3/33507* (2013.01); *G06F 1/3234* (2013.01); *H02M 3/335* (2013.01); *H02M 2001/0032* (2013.01)

(58) Field of Classification Search
CPC ............ H02M 3/335; H02M 3/33507; H02M 3/33515; H02M 3/33546; H02M 3/33569
USPC ............................ 363/21.01–21.11, 123–127
See application file for complete search history.

(56) References Cited

U.S. PATENT DOCUMENTS

| 7,057,907 B2 * | 6/2006 | Oh | H02M 3/33507 363/21.01 |
| 7,804,256 B2 * | 9/2010 | Melanson | H05B 33/0815 315/224 |
| 7,911,812 B2 * | 3/2011 | Colbeck | H02M 1/4225 363/21.02 |
| 7,994,758 B2 * | 8/2011 | Popescu | H02M 1/4225 323/235 |
| 8,102,679 B2 * | 1/2012 | Gong | H02M 3/156 363/21.04 |
| 8,477,514 B2 * | 7/2013 | Artusi | H02M 1/4225 363/21.01 |
| 8,482,938 B2 * | 7/2013 | Balakrishnan | H02M 3/33507 363/21.01 |

(Continued)

FOREIGN PATENT DOCUMENTS

| JP | H10304658 A | 11/1998 |
| JP | 2015103336 A | 6/2015 |
| JP | 2016021821 A | 2/2016 |

*Primary Examiner* — Thienvu V Tran
*Assistant Examiner* — Nusrat Quddus
(74) *Attorney, Agent, or Firm* — Harness, Dickey & Pierce, P.L.C.

(57) ABSTRACT

A device and method for controlling a power converter. The device includes an activation terminal configured to obtain a first voltage based on the input voltage; a controlling terminal configured to obtain a second voltage based on the output voltage; and a digital controller configured to obtain a driving power based on the first voltage and/or the second voltage; the digital controller is configured to obtain the driving power at least based on the first voltage when the power converter is stopped. Therefore, a sufficient driving power can be provided for the digital controller even when the power converter is stopped.

15 Claims, 6 Drawing Sheets

(56) References Cited

U.S. PATENT DOCUMENTS

| | | | |
|---|---|---|---|
| 8,867,245 B1* | 10/2014 | Hwang | H02M 1/4225 363/21.04 |
| 2005/0078492 A1 | 4/2005 | Takashashi | |
| 2008/0065920 A1 | 3/2008 | Suginaka et al. | |
| 2008/0198638 A1* | 8/2008 | Reinberger | H02M 3/3376 363/74 |
| 2009/0190384 A1* | 7/2009 | Thompson | H02M 3/158 363/125 |
| 2010/0008117 A1* | 1/2010 | Luthi | H02J 9/005 363/126 |
| 2010/0020575 A1 | 1/2010 | Shimada | |
| 2010/0135050 A1* | 6/2010 | Sonobe | H02M 1/36 363/21.07 |
| 2010/0164469 A1* | 7/2010 | Bansal | G06F 1/26 323/318 |
| 2011/0228565 A1* | 9/2011 | Griffin | H02M 1/36 363/21.01 |
| 2012/0069606 A1* | 3/2012 | Sagneri | H02M 3/158 363/21.02 |
| 2012/0092900 A1* | 4/2012 | Orr | H02M 1/4208 363/21.03 |
| 2012/0201065 A1* | 8/2012 | Nate | H02M 1/4225 363/126 |
| 2012/0250360 A1* | 10/2012 | Orr | H02M 3/3376 363/21.02 |
| 2013/0223120 A1* | 8/2013 | Dragojevic | H02M 7/06 363/126 |
| 2014/0321169 A1* | 10/2014 | Mueller | H02M 3/33515 363/21.02 |
| 2015/0349624 A1* | 12/2015 | Wang | H02M 1/4225 363/21.09 |
| 2015/0357912 A1* | 12/2015 | Perreault | H02M 1/4208 363/126 |
| 2015/0365003 A1* | 12/2015 | Sadwick | H02M 3/28 363/21.01 |
| 2016/0141951 A1* | 5/2016 | Mao | H02M 1/36 363/21.02 |
| 2016/0141964 A1* | 5/2016 | Yu | H02M 3/33507 363/21.02 |
| 2016/0181927 A1* | 6/2016 | Chang | H02M 1/42 363/21.02 |
| 2016/0181942 A1* | 6/2016 | Sugawara | H02M 3/156 363/126 |
| 2016/0365799 A1 | 12/2016 | Nakano | |

* cited by examiner

DEVICE AND METHOD FOR CONVERTING INPUT VOLTAGE TO OUTPUT VOLTAGE

TECHNICAL FIELD

Embodiments of the present disclosure generally relate to the field of power control circuits, and more particularly, to a device and method for controlling a power converter.

BACKGROUND

A power supply that is often used in telecommunications, transportation, industry and other applications may require electrical isolation between an input and an output of the power supply. A transformer with a primary winding and a secondary winding is often used to provide this isolation; furthermore, the transformer may also include an auxiliary winding.

In a power converter (such as a switching power supply circuit), a driving power is provided into a driver (or controlling device) of the power converter. For example, a controlling power supply voltage (Vcc) from a rectifier circuit is provided into the driver as the driving power when the switching power supply circuit is started (or may be referred to as activated or initiated) and an output voltage from the auxiliary winding of the transformer is provided into the driver as the driving power when the switching power supply circuit is working (for example, on a steady operation state after being started).

On the other hand, the driver of the power converter may include a digital controller. For example, the driver may include a low voltage circuit (i.e. a digital micro controller) and a high voltage circuit.

Reference document 1: JP2015-103336A
Reference document 2: US2016/0365799A1

This section introduces aspects that may facilitate a better understanding of the disclosure. Accordingly, the statements of this section are to be read in this light and are not to be understood as admissions about what is in the prior art or what is not in the prior art.

SUMMARY

The inventor found that the output voltage from the auxiliary winding of the transformer is still provided into the driver as the driving power when the power converter is stopped (or terminated) in the existing scheme.

However, in a case where the driver of the power converter includes a digital controller, the output voltage is unstable when the power converter is stopped, such that an operation of the digital controller becomes unstable.

For example, since the switching power supply circuit is stopped, an induced voltage in the auxiliary winding is decreased, such that the driving power from the induced voltage is decreased and may not meet a requirement of the digital controller. Therefore, when the digital controller performs some stopping operations (such as data is written into a nonvolatile memory), some problems such as data corruption may occur in a case where the driving power is decreased during the writing of the data.

In order to solve at least part of the above problems, methods, apparatus, devices are provided in the present disclosure. Features and advantages of embodiments of the present disclosure will also be understood from the following description of specific embodiments when read in conjunction with the accompanying drawings, which illustrate, by way of example, the principles of embodiments of the present disclosure.

In general, embodiments of the present disclosure provide a device and method for controlling a power converter. It is expected to provide a sufficient driving power for a digital controller even when a power converter is stopped.

In a first aspect, a device for controlling a power converter is provided. The power converter is configured to convert an input voltage to an output voltage; the device includes: an activation terminal configured to obtain a first voltage based on the input voltage; a controlling terminal configured to obtain a second voltage based on the output voltage; and a digital controller configured to obtain a driving power based on the first voltage and/or the second voltage; the digital controller is configured to obtain the driving power at least based on the first voltage when the power converter is stopped.

In one embodiment, the digital controller is further configured to obtain the driving power at least based on the first voltage when the power converter is started.

In one embodiment, the digital controller is further configured to obtain the driving power at least based on the second voltage when the power converter is working.

In one embodiment, the first voltage is converted to a controlling voltage, and the controlling voltage is provided into the digital controller as the driving power when the controlling voltage is lower than or equal to a predetermined voltage.

In one embodiment, the first voltage is decreased by more than or equal to 10% to generate the controlling voltage, and/or, the controlling voltage is equal to the second voltage.

In one embodiment, the device further includes: a switching element configured to provide the first voltage of the activation terminal to the controlling terminal when the switching element is on.

In one embodiment, the switching element is configured to be on according to an instruction from the digital controller or another controller when the power converter is stopped.

In one embodiment, the switching element is configured to be off according to an instruction from the digital controller or another controller when the power converter is working.

In a second aspect, a device for controlling a power converter is provided; the device includes: a digital controller configured to obtain a driving power to perform a controlling the power converter; and a startup circuit configured to generate a controlling voltage according to an instruction from the digital controller; wherein the digital controller is configured to obtain the driving power based on the controlling voltage when the power converter is stopped.

In a third aspect, a method for controlling a power converter is provided. The power converter is configured to convert an input voltage to an output voltage; the method includes: obtaining a first voltage by an activation terminal based on the input voltage; obtaining a second voltage by a controlling terminal based on the output voltage; and obtaining a driving power by a digital controller based on the first voltage and/or the second voltage; the driving power is obtained at least based on the first voltage when the power converter is stopped.

According to various embodiments of the present disclosure, the digital controller is configured to obtain the driving power at least based on the first voltage when the power converter is stopped. Therefore, a sufficient driving power is provided for the digital controller even when the power converter is stopped.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

The present disclosure will now be described with reference to several example embodiments. It should be understood that these embodiments are discussed only for the purpose of enabling those skilled persons in the art to better understand and thus implement the present disclosure, rather than suggesting any limitations on the scope of the present disclosure.

It should be understood that when an element is referred to as being "connected" or "coupled" or "contacted" to another element, it may be directly connected or coupled or contacted to the other element or intervening elements may be present. In contrast, when an element is referred to as being "directly connected" or "directly coupled" or "directly contacted" to another element, there are no intervening elements present. Other words used to describe the relationship between elements should be interpreted in a like fashion (e.g., "between" versus "directly between", "adjacent" versus "directly adjacent", etc.).

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof.

The term "based on" is to be read as "based at least in part on". The term "cover" is to be read as "at least in part cover". The term "one embodiment" and "an embodiment" are to be read as "at least one embodiment". The term "another embodiment" is to be read as "at least one other embodiment". Other definitions, explicit and implicit, may be included below.

In this disclosure, unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
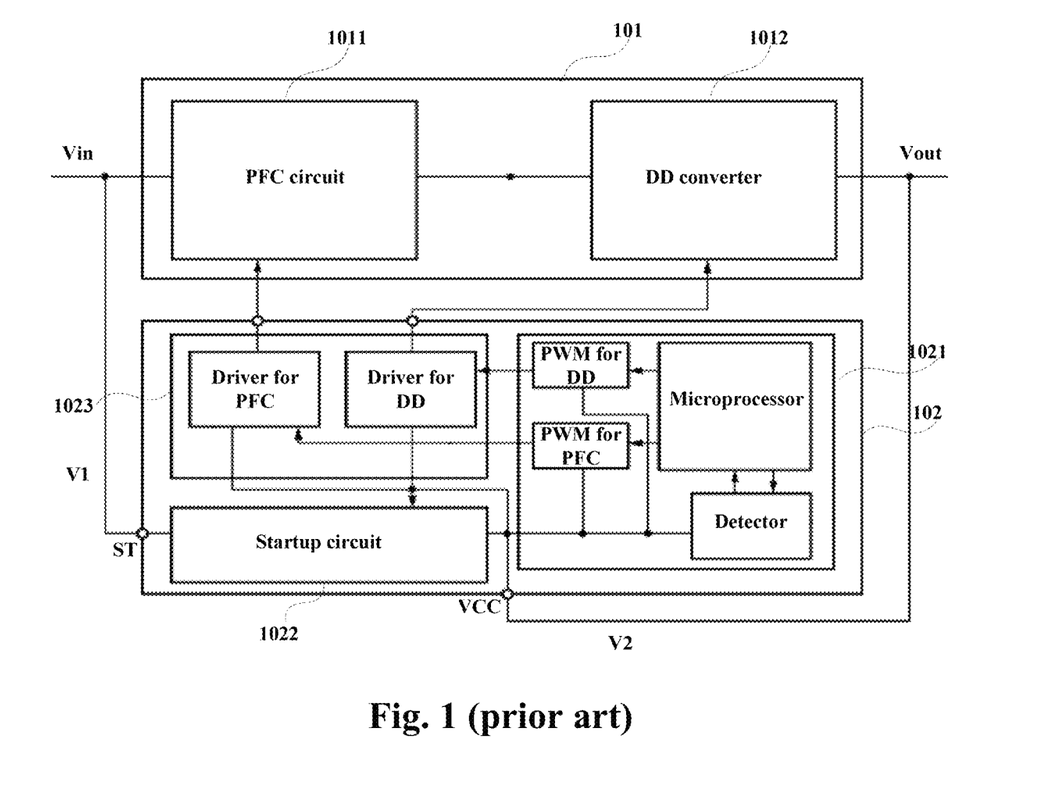
FIG. 1 is a diagram which shows a schematic illustration of a switching power supply circuit 101 and a controlling device 102 in the prior art.

FIG. 1 is a diagram which shows a schematic illustration of a switching power supply circuit 101 and a controlling device 102 in the prior art.

As shown in FIG. 1, a switching power supply circuit 101 is controlled by a controlling device 102. The switching power supply circuit 101 is configured to invert an input voltage (Vin) to an output voltage (Vout). Furthermore, the switching power supply circuit 101 may include a power factor correction (PFC) circuit 1011 and a direct current (DC)—direct current converter (DD converter) 1012.

As shown in FIG. 1, the controlling device 102 may include a controller 1021, a startup circuit 1022 and a driving circuit 1023. For example, the controller 1021 may include a low voltage circuit (it may be referred to as LV, such as a digital microprocessor) and a high voltage circuit (it may be referred to as HV, such as includes a detector, a pulse width modulation (PWM) circuit for DD and a PWM circuit for PFC); the driving circuit 1023 may include a driver for PFC and a driver for DD.

As shown in FIG. 1, the controlling device 102 may further include an activation terminal (or may be referred to as a startup terminal, ST) and a controlling terminal (may be noted by VCC). ST is configured to obtain (or be provided) a first voltage (V1) based on the input voltage (Vin); VCC is configured to obtain (or be provided) a second voltage (V2) based on the output voltage (Vout).

The controller 1021 is further configured to obtain the driving power at least based on the first voltage (V1) when the switching power supply circuit 101 is started and obtain the driving power at least based on the second voltage (V2) when the switching power supply circuit 101 is working.

Figure 2:
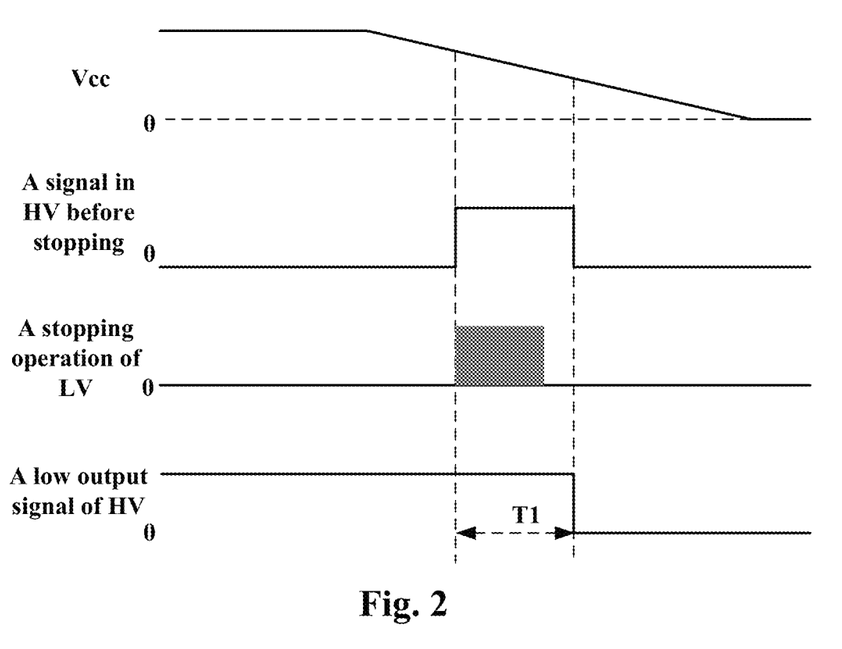
FIG. 2 is a diagram which shows some signal examples of some components or elements in FIG. 1 when the switching power supply circuit 101 is stopped.

FIG. 2 is a diagram which shows some signal examples of some components or elements in FIG. 1 when the switching power supply circuit 101 is stopped. As shown in FIG. 2, Vcc (a voltage of the controlling terminal VCC) is decreased to zero rapidly since it is based on the output voltage.

Therefore, a duration (T1) of a low output signal of HV in the high voltage circuit is relatively short, some problems such as power shortage causing data corruption may occur in the low voltage circuit. It is expected to provide a sufficient driving power for the digital controller even when the power converter is stopped.

In this disclosure, the power converter may be a non-switching power supply circuit such as a linear regulator, or it may be a switching power supply circuit such as an insulated type, a non-insulating type or a wireless power transmission device; and it is not limited in this disclosure.

Moreover, the power converter may include a multistage power supply circuit generating one or more intermediate voltages; and it is not limited in this disclosure.

A First Aspect of Embodiments

A device for controlling a power converter is provided in the embodiments.

Figure 3:
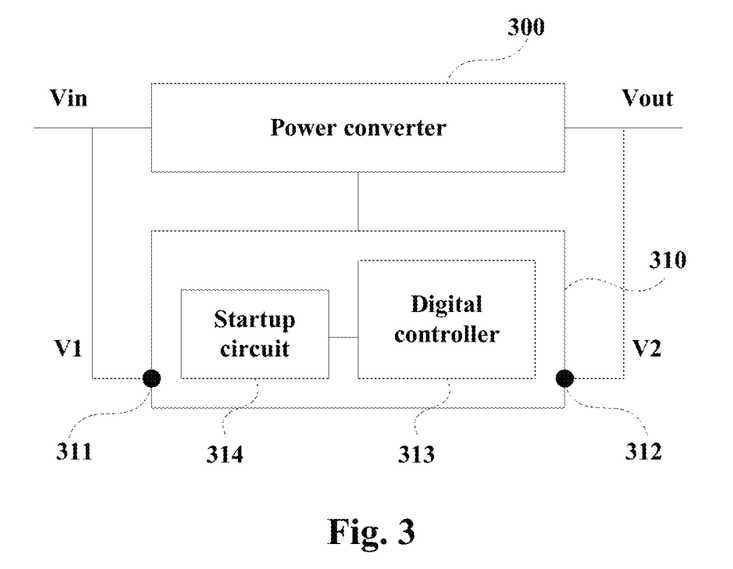
FIG. 3 is a diagram which shows a schematic illustration of a power converter 300 and a device 310 for controlling the power converter 300 in accordance with an embodiment of the present disclosure.

FIG. 3 is a diagram which shows a schematic illustration of a power converter 300 and a device 310 for controlling the power converter 300 in accordance with an embodiment of the present disclosure.

As shown in FIG. 3, the power converter 300 is used to convert an input voltage (Vin, such as a direct current voltage or direct voltage) to an output voltage (Vout, such as a direct current voltage or direct voltage). The power converter 300 may include a switching element, such as an IGFET (Insulated Gate Field Effect Transistor), a MOSFET (Metal Oxide Semiconductor Field Effect Transistor) or an IGBT (Insulated Gate Bipolar Transistor), and so on; and it is not limited in this disclosure.

As shown in FIG. 3, the device 310 includes an activation terminal 311 configured to obtain a first voltage (V1) based on the input voltage (Vin); a controlling terminal 312 configured to obtain a second voltage (V2) based on the output voltage (Vout); and a digital controller 313 configured to obtain a driving power based on the first voltage and/or the second voltage.

In this disclosure, the digital controller 313 is configured to obtain the driving power at least based on the first voltage when the power converter 300 is stopped (or terminated). Therefore, a sufficient driving power is provided for the digital controller 313 even when the power converter 300 is stopped.

In an embodiment, the digital controller 313 is further configured to obtain the driving power at least based on the first voltage when the power converter 300 is started (or activated, initiated), and/or, the digital controller 313 is further configured to obtain the driving power at least based on the second voltage when the power converter 300 is working (on a working state or on a steady operation state).

As shown in FIG. 3, the device 310 may further include a startup circuit 314 configured to be controlled by the digital controller 313. The digital controller 313 may be configured to perform a sequence controlling of the power converter 300.

For example, the sequence controlling of the power converter may include at least one of a switching of starting and working, a switching of working and stopping, and a switching of starting and stopping.

In an embodiment, the startup circuit 314 is further configured to convert the first voltage to a controlling voltage; and the controlling voltage is provided into the digital controller as the driving power when the controlling voltage is lower than or equal to a predetermined voltage.

For example, in a starting stage, the controlling voltage start from zero and the startup circuit has to work to provide power to the controller. Additionally, in a stopping stage, when the controlling voltage is lower than or equal to a predetermined voltage, the startup circuit 314 can provide power to the controller as a buck-up power supply.

For example, the first voltage may be decreased by more than or equal to 10% to generate the controlling voltage (which is higher than or equal to a minimal working voltage of the digital controller), and/or, the controlling voltage may be equal to the second voltage.

It should be appreciated that some components or elements are illustrated as examples in FIG. 3. However, it is not limited thereto, for example, connections or positions of the components or elements may be adjusted, and/or, some components or elements may be omitted. Moreover, some components or elements not shown in FIG. 3 may be added, while components or elements shown in FIG. 3 but not explained can be referred in the relevant art.

Figure 4:
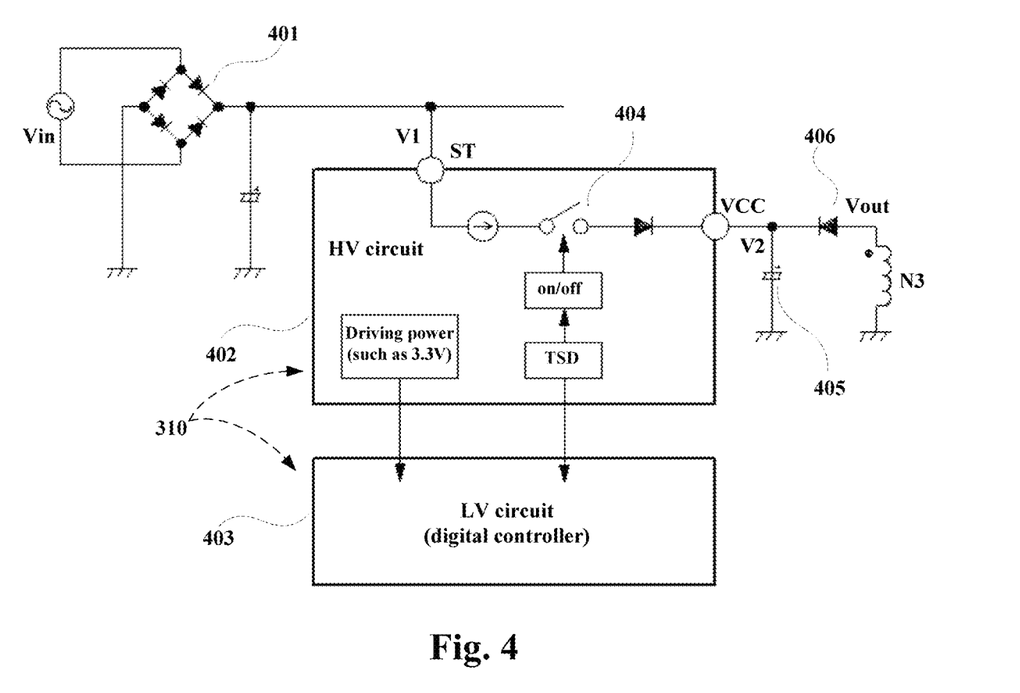
FIG. 4 is another diagram which shows another schematic illustration of the device 310 for controlling the power converter 300 in accordance with an embodiment of the present disclosure.

FIG. 4 is another diagram which shows a schematic illustration of the device 310 for controlling the power converter 300 in accordance with an embodiment of the present disclosure. For the sake of simplicity and clarification, some components or elements (such as the power converter 300) are omitted in FIG. 4.

As shown in FIG. 4, for example, an input voltage (Vin) may come from a rectifier circuit 401 and be converted to the first voltage (V1) on the activation terminal 311 (denoted by ST in FIG. 4); an output voltage (Vout) may come from an auxiliary winding (N3) of a transformer and be converted to the second voltage (V2) on the controlling terminal 312 (denoted by VCC in FIG. 4).

As shown in FIG. 4, the device 310 may include a high voltage (HV) circuit 402 and a low voltage (LV) circuit 403 (a digital controller). The high voltage circuit 402 may obtain a driving power from VCC and the low voltage circuit 403 may obtain a driving power (such as 3.3 V) from the high voltage circuit 402.

As shown in FIG. 4, the device 310 may further include a switching element 404 configured to provide the first voltage of the activation terminal 311 (ST) to the controlling terminal 312 (VCC) when the switching element 404 is on.

In an embodiment, the switching element 404 is configured to be on according to an instruction from the low voltage circuit 403 (the digital controller) or the high voltage circuit 402 (another controller) when the power converter 300 is stopped. The switching element 404 is further configured to be off according to an instruction from the digital controller or another controller when the power converter is working.

As shown in FIG. 4, a capacitor 405 and a diode 406 may be configured and be connected to the controlling terminal 312. It should be appreciated that some components or elements are illustrated as examples in FIG. 4. However, it is not limited thereto, for example, connections or positions of the components or elements may be adjusted, and/or, some components or elements may be omitted. Moreover, some components or elements not shown in FIG. 4 may be added, while components or elements shown in FIG. 4 but not explained can be referred in the relevant art.

For example, in a starting stage when the power converter 300 is started, the input voltage is supplied (or be provided) to the power converter 300 and V1 is supplied to ST; the startup circuit 314 converts V1 to a controlling voltage (for example, it is equal to V2), while the switching element 404 is on and the capacitor 405 is charged. When a voltage of the capacitor 405 reaches the controlling voltage, the digital controller 313 obtains the driving power and is activated. As the operation of the power converter 300, the output voltage is increased.

In a working stage when the power converter 300 is working, the output voltage reaches a predetermined voltage and V2 is supplied to VCC; the startup circuit 314 is stopped and the switching element 404 is off, the digital controller 313 obtains the driving power based on the V2.

In a stopping stage when the power converter 300 is stopped, such as receiving in instruction from an external device or detecting out an abnormal case, V1 is supplied to ST; the startup circuit 314 is activated and converts V1 to a controlling voltage (for example, it is equal to V2), while the switching element 404 is on and the digital controller 313 obtains the driving power from the controlling voltage, such that the digital controller 313 can be maintained on a working state for a longer time. The device 310 may generate a signal in HV before stopping as an internal trigger to make itself to the stopping stage.

Figure 5:
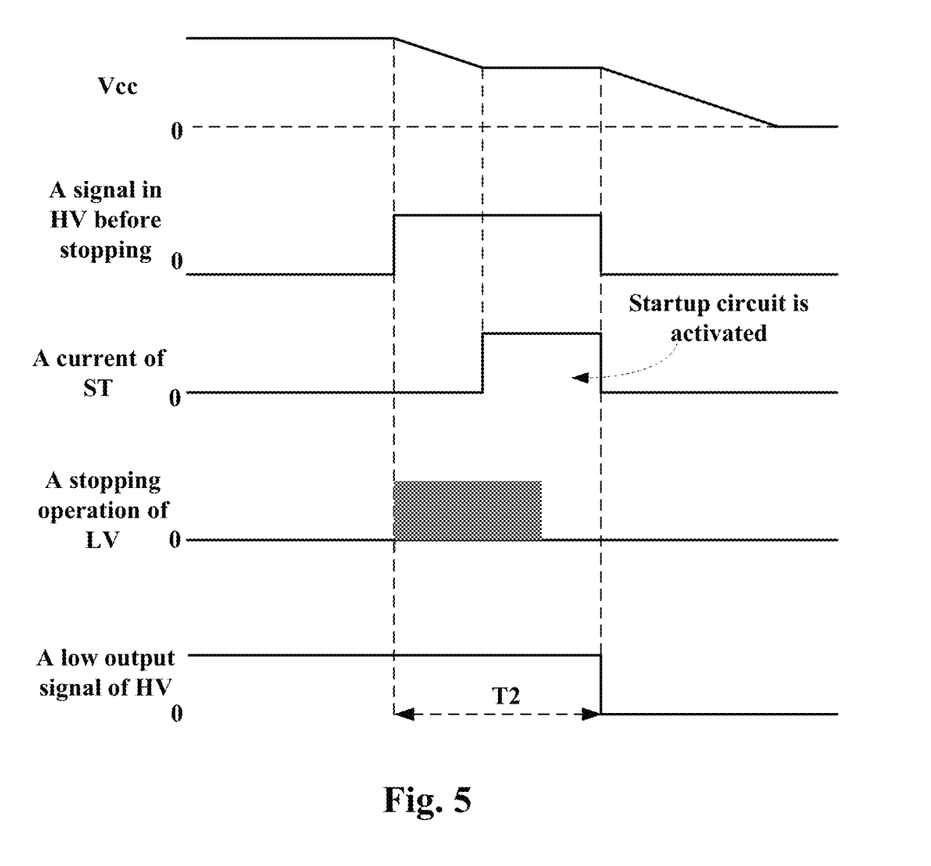
FIG. 5 is a diagram which shows some signal examples of some components or elements in FIG. 4 when the power converter 300 is stopped.

FIG. 5 is a diagram which shows some signal examples of some components or elements in FIG. 4 when the power converter 300 is stopped. As shown in FIG. 5, Vcc (a voltage of the controlling terminal VCC) is decreased first since the output voltage is decreased, then it is maintained on a level since the first voltage is supplied, then it is decreased to zero since the supplying of the first voltage is stopped. In an embodiment, a current of ST starts to flow when the voltage of the controlling terminal VCC lower than the predetermined voltage is detected.

Therefore, a duration (T2) of the low output signal of HV is relatively long, some problems such as data corruption may not occur and a sufficient driving power can be provided for the digital controller even when the power converter is stopped.

In an embodiment, when the power converter 300 is stopped by the device 310, the digital controller 313 can be switched into a low power consumption mode. It is possible to reduce a current consumption of the digital controller 313 compared to the steady operation.

Figure 6:
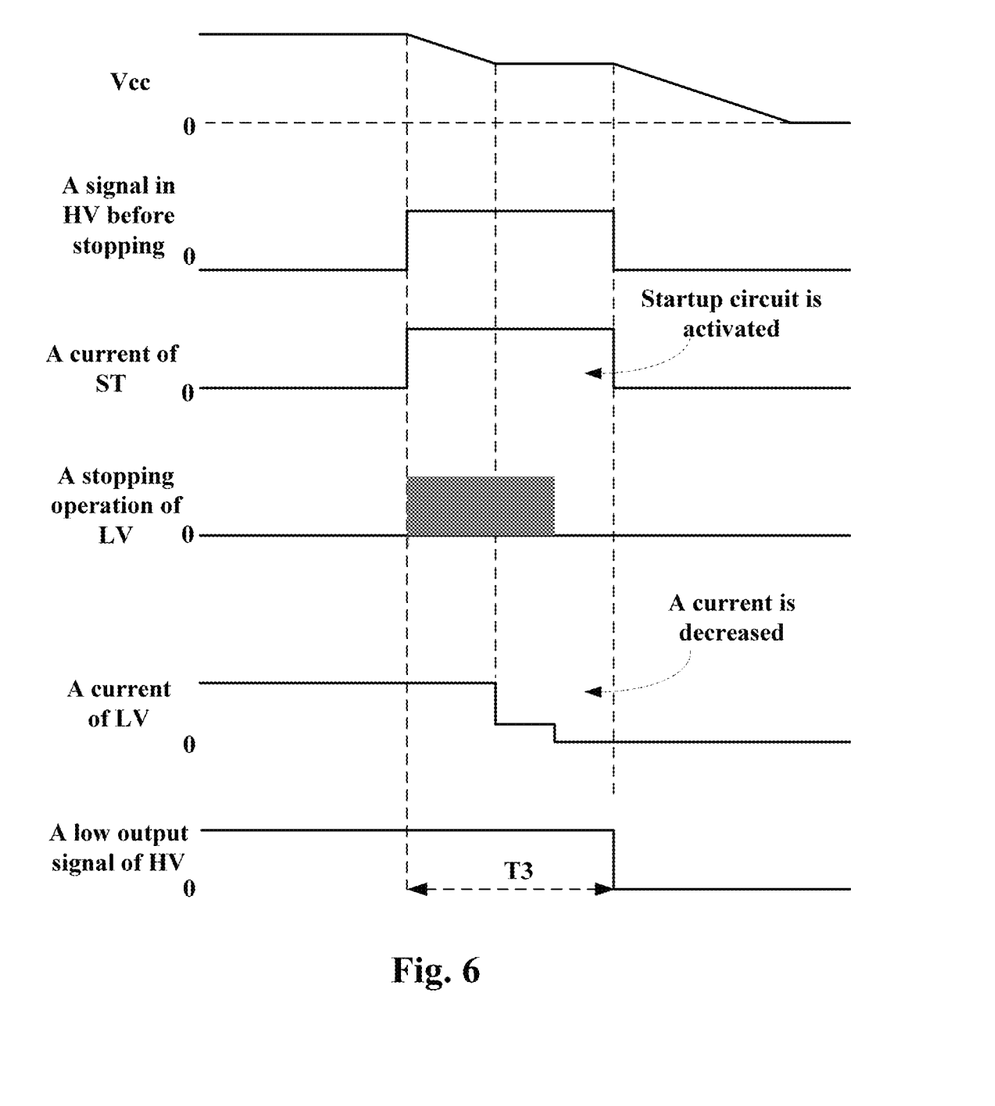
FIG. 6 is another diagram which shows some signal examples of some components or elements in FIG. 4 when the power converter 300 is stopped.

FIG. 6 is another diagram which shows some signal examples of some components or elements in FIG. 4 when the power converter 300 is stopped. As shown in FIG. 6, Vcc (a voltage of the controlling terminal VCC) is decreased first since the output voltage is decreased, then it is maintained on a level since the first voltage is supplied, then it is decreased to zero since the supplying of the first voltage is stopped. In an embodiment, a current of ST starts to flow when a signal in HV before stopping is detected.

Therefore, a duration (T3) of the low output signal of HV is relatively long, some problems such as data corruption may not occur and a sufficient driving power can be provided for the digital controller even when the power converter is stopped.

As shown in FIG. 6, a current in the low voltage circuit may be decreased gradually since the low voltage circuit is switched into a low power consumption mode, such as CPU is terminated or a clock frequency is reduced.

In an embodiment, a device for controlling a power converter 300 is provided. the device 310 includes: a digital controller 313 configured to obtain a driving power to perform a controlling the power converter 300; and a startup circuit 314 configured to generate a controlling voltage according to an instruction from the digital controller 313; the digital controller 313 is configured to obtain the driving power based on the controlling voltage when the power converter 300 is stopped.

In an embodiment, the controlling voltage is provided into the digital controller 313 as the driving power when the controlling voltage lower than or equal to a predetermined voltage is detected.

In an embodiment, the controlling voltage is provided into the digital controller 313 as the driving power when an internal trigger signal is generated to make the digital controller 313 to a stopping stage.

In an embodiment, the startup circuit 314 may further include a switching element configured to provide the controlling voltage when the switching element is on.

It is to be understood that, the above examples or embodiments are discussed for illustration, rather than limitation. Those skilled in the art would appreciate that there may be many other embodiments or examples within the scope of the present disclosure.

As can be seen from the above embodiments, the digital controller is configured to obtain the driving power at least based on the first voltage when the power converter is stopped. Therefore, a sufficient driving power is provided for the digital controller even when the power converter is stopped.

A Second Aspect of Embodiments

A method for controlling a power converter is provided in the embodiments. The corresponding device 310 and the power converter 300 are illustrated in the first aspect of embodiments, and the same contents as those in the first aspect of embodiments are omitted.

Figure 7:
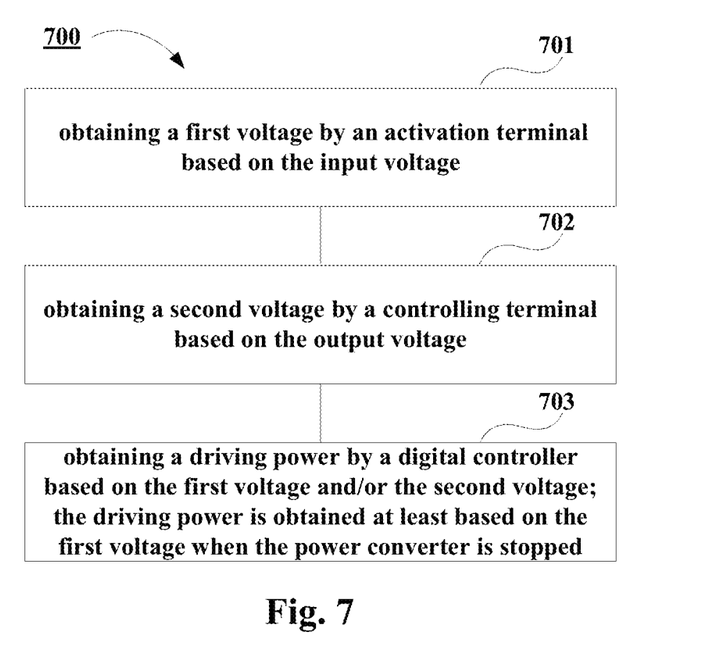
FIG. 7 is a diagram which shows a method for controlling a power converter in accordance with an embodiment of the present disclosure.

FIG. 7 is a diagram which shows a method for controlling a power converter in accordance with an embodiment of the present disclosure. As shown in FIG. 7, the method 700 includes:

Block 701, obtaining a first voltage by an activation terminal based on the input voltage.

Block 702, obtaining a second voltage by a controlling terminal based on the output voltage; and Block 703, obtaining a driving power by a digital controller based on the first voltage and/or the second voltage; the driving power is obtained at least based on the first voltage when the power converter is stopped.

In an embodiment, the driving power is obtained at least based on the first voltage when the power converter is started, and/or, the driving power is obtained at least based on the second voltage when the power converter is working.

In an embodiment, the first voltage is converted to a controlling voltage; and the controlling voltage is provided into the digital controller as the driving power when the controlling voltage is lower than or equal to a predetermined voltage. For example, the first voltage is decreased by more than or equal to 10% to generate the controlling voltage, and/or, the controlling voltage is equal to the second voltage.

In an embodiment, the first voltage of the activation terminal is provided by a switching element to the controlling terminal when the switching is on. For example, the switching element is configured to be on according to an instruction from the digital controller or another controller when the power converter is stopped; the switching element is configured to be off according to an instruction from the digital controller or another controller when the power converter is working.

It should be appreciated that FIG. 7 is only an example of the disclosure, but it is not limited thereto. For example, the order of operations at blocks or steps may be adjusted, and/or, some blocks or steps may be omitted. Moreover, some blocks or steps not shown in FIG. 7 may be added.

As can be seen from the above embodiments, the digital controller is configured to obtain the driving power at least based on the first voltage when the power converter is stopped. Therefore, a sufficient driving power is provided for the digital controller even when the power converter is stopped.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device.

While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous.

Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A device for controlling a power converter which converts an input voltage to an output voltage; wherein the device comprises:
    an activation terminal configured to obtain a first voltage based on the input voltage;
    a controlling terminal configured to obtain a second voltage based on the output voltage; and
    a digital controller configured to obtain a driving power based on the first voltage and/or the second voltage;
    wherein the digital controller is configured to obtain the driving power at least based on the first voltage when the power converter is stopped;
    wherein the first voltage is converted to a controlling voltage of the digital controller, and the controlling voltage is provided into the digital controller as the driving power when it is detected that the controlling voltage is lower than or equal to a predetermined voltage;
    wherein the first voltage is decreased by more than or equal to 10% to generate the controlling voltage, and/or, the controlling voltage is equal to the second voltage.

2. The device according to claim 1, wherein the digital controller is further configured to obtain the driving power at least based on the first voltage when the power converter is started.

3. The device according to claim 1, wherein the digital controller is further configured to obtain the driving power at least based on the second voltage when the power converter is working.

4. The device according to claim 1, wherein the device further comprises:
    a switching element configured to provide the first voltage of the activation terminal to the controlling terminal when the switching element is on.

5. The device according to claim 4, wherein the switching element is configured to be on according to an instruction from the digital controller or another controller when the power converter is stopped.

6. The device according to claim 4, wherein the switching element is configured to be off according to an instruction from the digital controller or another controller when the power converter is working.

7. A device for controlling a power converter which converts an input voltage to an output voltage; wherein the device comprises:
    a digital controller configured to obtain a driving power to perform a controlling the power converter;
    a startup circuit configured to generate a controlling voltage of the digital controller according to an instruction from the digital controller; wherein the digital controller is configured to obtain the driving power based on the controlling voltage when the power converter is stopped;
    wherein the controlling voltage is provided into the digital controller as the driving power when it is detected that the controlling voltage is lower than or equal to a predetermined voltage;
    wherein a first voltage is decreased by more than or equal to 10% to generate the controlling voltage, and/or, the controlling voltage is equal to a second voltage.

8. The device according to claim 7, wherein the controlling voltage is provided into the digital controller as the driving power when an internal trigger signal is generated to make the digital controller to a stopping stage.

9. The device according to claim 7, wherein the startup circuit further comprises:
    a switching element configured to provide the controlling voltage when the switching element is on.

10. A method for controlling a power converter which converts an input voltage to an output voltage, wherein the method comprises:
    obtaining a first voltage by an activation terminal based on the input voltage;
    obtaining a second voltage by a controlling terminal based on the output voltage; and
    obtaining a driving power by a digital controller based on the first voltage and/or the second voltage, wherein the driving power is obtained at least based on the first voltage when the power converter is stopped;
    wherein the first voltage is converted to a controlling voltage of the digital controller, and the controlling voltage is provided into the digital controller as the driving power when it is detected that the controlling voltage is lower than or equal to a predetermined voltage;

wherein the first voltage is decreased by more than or equal to 10% to generate the controlling voltage, and/or, the controlling voltage is equal to the second voltage.

11. The method according to claim 10, wherein the driving power is obtained at least based on the first voltage when the power converter is started.

12. The method according to claim 10, wherein the driving power is obtained at least based on the second voltage when the power converter is working.

13. The method according to claim 10, wherein the method further comprises:
providing the first voltage of the activation terminal by a switching element to the controlling terminal when the switching element is on.

14. The method according to claim 13, wherein the switching element is configured to be on according to an instruction from the digital controller or another controller when the power converter is stopped.

15. The method according to claim 13, wherein the switching element is configured to be off according to an instruction from the digital controller or another controller when the power converter is working.

* * * * *